United States Patent [19]

Newnan

[11] Patent Number: 4,878,625

[45] Date of Patent: Nov. 7, 1989

[54] BEAN AND NUT GRINDER SHIFT MECHANISM

[75] Inventor: Brian D. Newnan, Louisville, Ky.

[73] Assignee: Grindmaster Corporation, Louisville, Ky.

[21] Appl. No.: 225,929

[22] Filed: Jul. 29, 1988

[51] Int. Cl.[4] ............................................... B02C 7/14
[52] U.S. Cl. .................................... 241/37; 241/259.1; 241/290
[58] Field of Search ...................... 241/37, 32, 100, 34, 241/259.1, 290, 259.2, 259.3, 261.2, 261.3

[56] References Cited

U.S. PATENT DOCUMENTS

| | | |
|---|---|---|
| 1,485,855 | 3/1924 | Kidney . |
| 2,094,548 | 9/1937 | Meeker .......................... 241/259.3 X |
| 3,799,456 | 3/1974 | Jewell et al. . |
| 4,037,801 | 7/1977 | Jimenez . |
| 4,085,899 | 4/1978 | Boothe .......................... 241/259.3 X |

*Primary Examiner*—Mark Rosenbaum
*Attorney, Agent, or Firm*—Maurice L. Miller, Jr.

[57] ABSTRACT

A grinder refinement mechanism for use with a conventional coffee or peanut grinder is disclosed. The grinder includes the usual screw conveyor having a rotary grinding burr attached to a forward end thereof, a stationary grinding burr connected to a wall of the grinder housing and a main spring which biases the screw conveyor toward the forward end of the grinder housing against an adjustment screw projecting through an end wall. The mechanism includes a lever arm pivotally attached to an outside surface of the end wall and an electrical solenoid connected to the arm. The usual adjustment screw is replaced with a plunger element which slidably projects both into and out of the end wall and is confined between a forward end of the screw conveyor and the arm. In one condition of the solenoid, the main spring forces the screw conveyor and plunger forwardly to hold the arm against a stop screw which thus determines the desired coarse grinding condition of the grinder burrs. In the other condition of the solenoid, the arm is drawn off the stop screw to force the plunger and screw conveyor rearwardly in opposition to the main spring to a fine grinding condition of the grinder burrs. The coarse and fine grinding conditions of the grinder burrs can be precisely adjusted by the stop screw and a screw mounted on the arm which bears on the plunger. Additional solenoids may be employed in different arrangements to obtain more than two grinding conditions such as coarse, intermediate and fine grinding conditions. A relief spring connected between each of the solenoids and the arm permit the arm to flex momentarily when the grinder encounters binding or jamming to relieve such conditions.

18 Claims, 3 Drawing Sheets

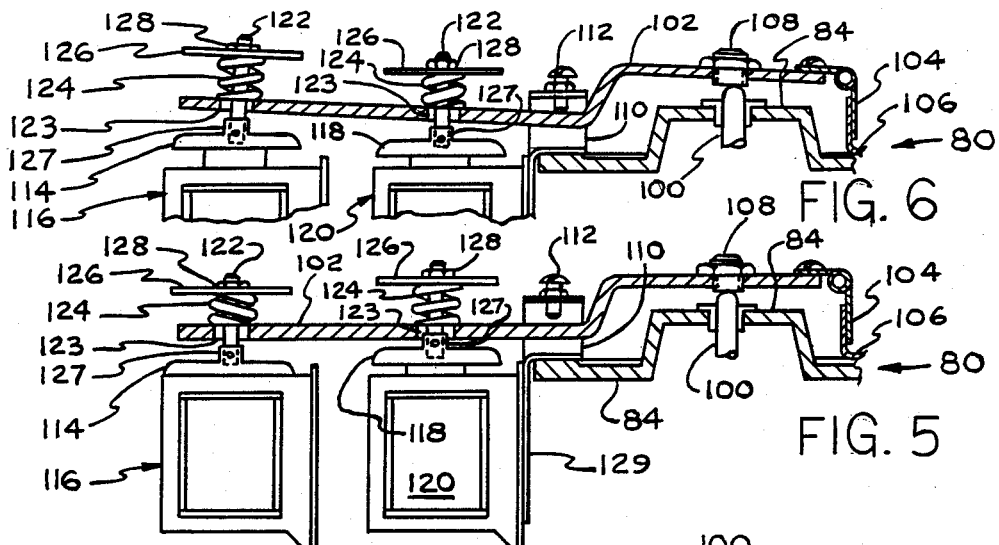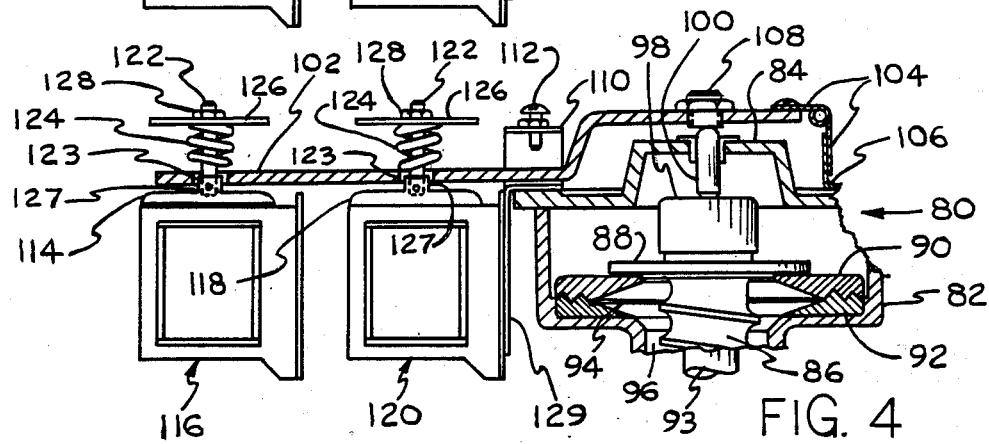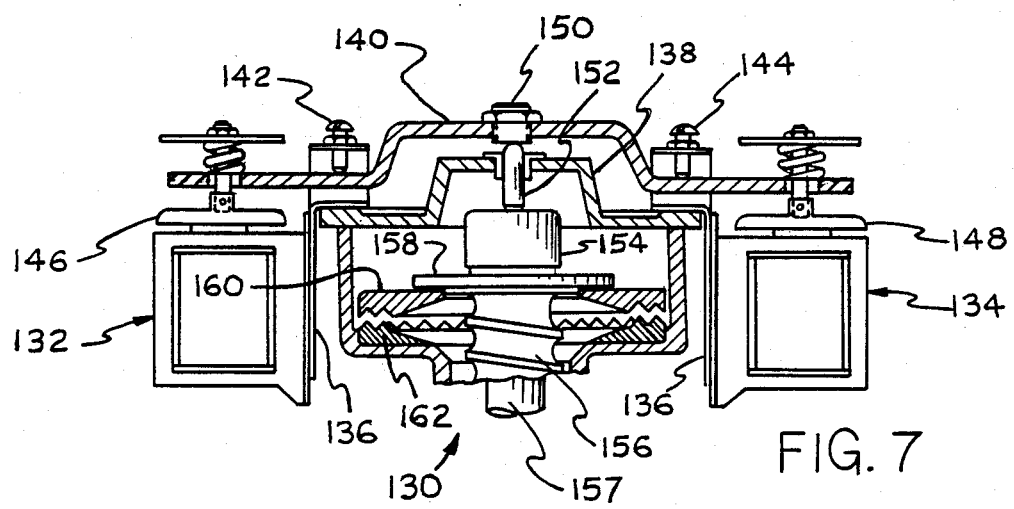

BEAN AND NUT GRINDER SHIFT MECHANISM

BACKGROUND OF THE INVENTION

This invention relates generally to means for shifting a bean or nut grinder between two or more distinct and preselected settings to enable the grinder to grind such beans or nuts to two or more separate particulate sizes as desired, one being a coarse grind setting and the other being at least one fine grind setting. More specifically, the invention relates to a shifting mechanism for a bean or nut grinder employing a pivotal lever arm for moving a rotary grinding burr toward a stationary grinding burr in response to pivoting movement of the lever arm to shift the grinder from a coarse grind setting to at least one fine grind setting.

Generally speaking, such grinders having means for moving a rotary burr toward or away from a stationary burr in order to change the particulate size of the resulting grounds have long been known and used in the prior art. The coffee mill disclosed in U.S. Pat. No. 1,485,855 issued to W. E. Kidney on Mar. 4, 1924 is an early example of such a grinder. The reference grinder includes a housing, a stationary grinding burr attached to a wall of the housing, a drive shaft, a rotary burr slidably keyed to the drive shaft for rotation therewith, and a flanged sleeve surrounding the drive shaft which is movable along the same and engagable with the rotary burr. Also included is a second sleeve surrounding the flanged sleeve and engaging the flange thereof, which is in threadable engagement with the housing, and a hand wheel connected to the second sleeve.

Likewise, the coffee grinders shown in the drawings hereof are typical prior art grinders which include a rotary screw conveyor for transporting coffee beans from a hopper to a grinder consisting of a stationary grinding burr and a linearly movable and rotatable grinding burr attached to an end plate of the screw conveyor. The screw conveyor is keyed to a motor driven drive shaft for rotary motion therewith but is translatable along the latter to adjust the spacing between the grinding burrs. A spring surrounding a portion of the drive shaft and confined between a wall of the housing and the screw conveyor urges the latter forwardly in the housing against a screw threadably connected to an end cap and projecting into the housing against a forward end of the screw conveyor. Upon manual adjustment of the screw, the distance between the burrs can be changed to change the particulate size of coffee to be ground therebetween.

Such prior art grinders, however, do not provide for rapid, precise and automatic adjustment of the spacing between the grinding burrs to permit the obtaining of two or more distinct particulate sizes of ground coffee as is often desired. Manual adjustment of the grinder refinement screw in these prior art grinders is inexact, often requiring time consuming trial and error adjustments each time that a different particulate size is sought. By means of my invention, these and other difficulties encountered using conventionally adjustable coffee grinders are substantially eliminated.

SUMMARY OF THE INVENTION

It is an object of my invention to provide a shift mechanism for an adjustable bean or nut grinder which permits rapid, precise and automatic adjustment of the grinder for obtaining two or more distinct particulate sizes.

It is another object of my invention to provide a shift mechanism for an adjustable bean or nut grinder which includes a pivotally movable lever arm operatively associated with a movable burr of the grinder to change the spacing between the movable burr and a stationary burr by a predetermined amount to change said grinder from a coarse grinding condition to at least one fine grinding condition.

Briefly, in accordance with my invention, there is provided a grinder shift mechanism in combination with a bean or nut grinder of the type which includes a housing and an adjustable grinder means disposed in the housing for grinding beans or nuts to a selected particulate size within a range of permissible sizes. The mechanism includes biasing means for urging the grinder means toward a predetermined coarse grinding condition to grind the beans or nuts to a predetermined maximum particulate size. A shifting means is also provided which is operatively associated with the grinder means for shifting the grinder means from the coarse grinding condition to a first fine grinding condition in opposition to the biasing means to grind the beans or nuts to a predetermined minimum particulate size. Lastly, there is provided means operatively associated with the shifting means for actuating the shifting means upon command by changing from a first state to a second state.

These and other objects, features and advantages of my invention will become apparent to those skilled in the art from the following detailed description and attached drawings upon which, by way of example, only the preferred embodiments of my invention are illustrated, the same being the best modes contemplated by me at the present time for carrying my invention into practice.

BRIEF DESCRIPTION OF THE DRAWINGS

FIG. 4 shows a cross-sectional axial view of a fragment of a coffee grinder and an unbalanced three stage grinder shift mechanism, the mechanism being shown in a condition for fine grinding, thus illustrating another preferred embodiment of my invention.

FIG. 5 shows the grinder and grinder shift mechanism of FIG. 4, the same as viewed in the latter Figure, except that the mechanism is shown in an intermediate grinding condition between the fine grinding condition of FIG. 4 and a coarse grinding condition.

FIG. 6 shows the grinder and grinder shift mechanism of FIGS. 4-5, the same as viewed in those figures except that the mechanism is shown in a condition for coarse grinding.

FIG. 7 shows a cross-sectional axial view of a coffee grinder and a balanced three stage grinder shift mechanism, the grinder and mechanism being shown in a condition for coarse grinding, thus illustrating another preferred embodiment of my invention.

DESCRIPTION OF THE PREFERRED EMBODIMENTS

Figure 1:
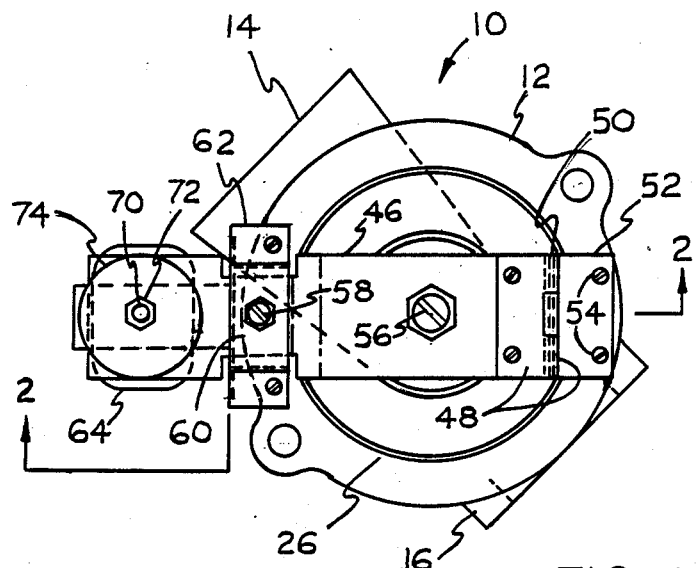
FIG. 1 shows an end view of a coffee grinder and two stage grinder shift mechanism, thus illustrating one preferred embodiment of my invention.
Figure 2:
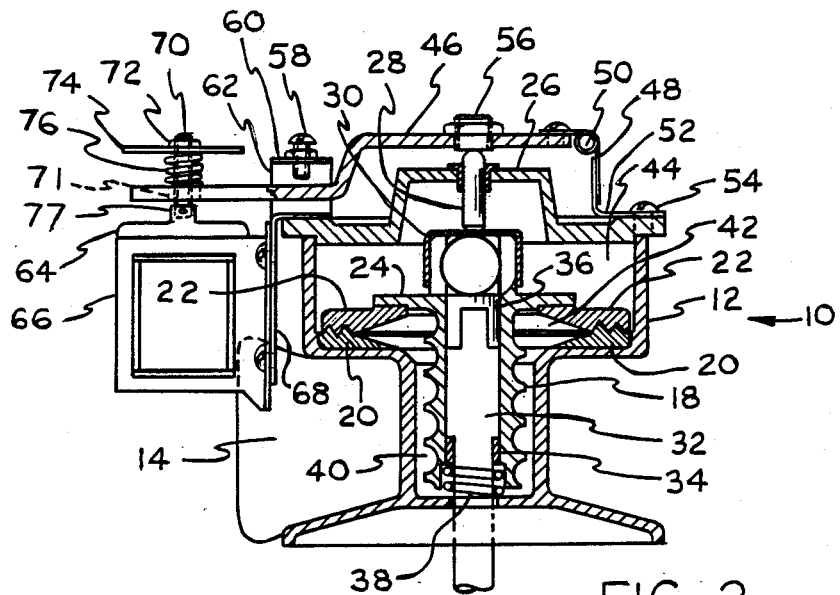
FIG. 2 shows a cross-sectional axial view of the grinder and grinder shift mechanism of FIG. 1 as viewed along cross-section lines 2—2 of the latter mentioned Figure, the mechanism and grinder burrs being in a condition for fine grinding.
Figure 3:
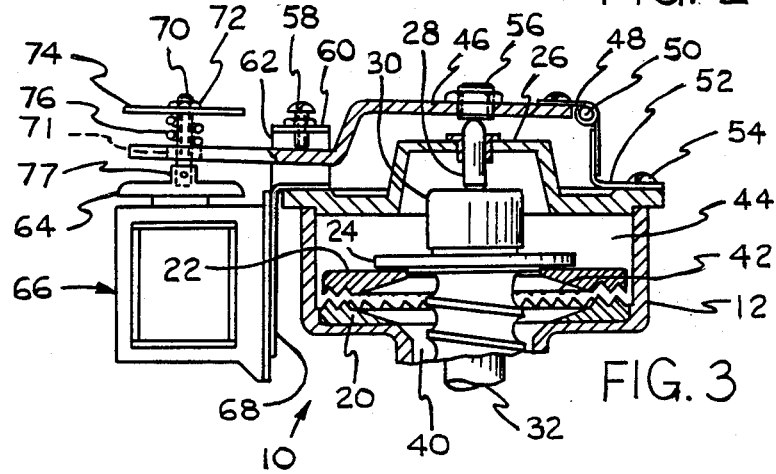
FIG. 3 shows a cross-sectional axial view of a fragment of the grinder and grinder shift mechanism of FIGS. 1-2, the same as viewed in FIG. 2 except that the mechanism and grinder burrs are shown in a condition for coarse grinding.

Referring now to FIGS. 1–3, there is shown, in one preferred embodiment of my invention, a conventional coffee bean grinder 10 which includes a housing 12, a bean hopper 14 which projects both into and out of the housing 12 and a spout 16 for discharging ground coffee from the housing 12. Other conventional elements of the grinder 10 as best seen in FIG. 2 include a motor driven rotary feed worm or screw conveyor 18, a stationary circular grinding burr 20 fixedly attached to an interior wall of the housing 12, and a rotatable circular grinding burr 22 attached to a disc shaped plate 24 of the screw conveyor 18 for both rotary and translatory movement with the latter. An end cap 26 encloses a front end of the housing 12 and contains a central, circular opening through which a metal plunger element 28 projects. An end of the plunger element 28 which extends into the interior of the housing 12 abuts against a cover 30 which is, in turn, fixedly attached to a forward end of the screw conveyor 18.

The screw conveyor 18 is rotatably driven by a drive shaft 32 which extends through a sleeve 34 into the keyway of a keeper element 36. A coiled main spring 38 extends along and around a portion of the drive shaft 32 and is confined between a rear wall of the grinder housing 12 and a rear end of the sleeve 34 and tends to urge the screw conveyor 18 forwardly. This biasing action of the spring 38 tends to urge the rotary grinding burrs 22 forwardly away from the stationary burrs 20 toward an open, coarse grinding position (See the open position of the burrs 20 and 22, representative of the coarse grinding condition of the grinder 10 as shown in FIG. 3). In actual operation, coffee beans loaded into the hopper 14 gravitate through an opening into a chamber 40 containing the screw conveyor 18 and are transported forwardly into an annularly shaped grinding chamber 42 wherein the beans disperse radially outwardly into contact with the burrs 20 and 22 to be ground to a suitable particulate size. The resulting grindings filter radially outwardly through the periphery of the burrs 20 and 22 into a chamber 44 and are swept into and dispersed from the housing 12 through the spout 16, all in the usual well known manner.

The grinder shift mechanism of my invention as shown in the present example includes a shifting means which, in this case, is a lever arm 46, one end of which is pivotally connected by means of a hinge 48 containing a pivot pin 50 to an L-shaped bracket 52. The bracket 52 is, in turn, fixedly attached to an edge portion of the end cap 26 by a pair of machine screws 54. The lever 46 extends from the hinge 48 over the center of the end cap 26 and contains an adjustment screw 56 which bears upon an end of the plunger element 28 which projects forwardly out of the end cap 26. The lever 46 further extends across the end cap 26 under a stop means or adjustable stop screw 58 which projects through an overhanging surface 60 of a bracket 62, the latter being attached to a peripheral edge portion of the end cap 26 opposite the bracket 52. An end portion of the lever 46 opposite the hinged end extends beyond the screw 58 and periphery of the end cap 26 and is connected to a plunger 64 of an electrically operated solenoid 66 which acts as an actuating means for the lever arm 46. The solenoid 66 is attached to an L-shaped bracket 68 depending from the end cap 26. A pin 70 is pivotally connected on one end to the solenoid plunger 64 and extends through and beyond a circular opening 71 in the unhinged end portion of the lever 46. An upper end of the pin 70, as viewed in FIGS. 2–3, is threaded and contains a nut 72. A disc shaped washer 74 and coiled relief spring 76 are disposed over the pin 70 and confined between the nut 72 and opposing surface of the lever 46. The opening 71 should have a diameter larger than that of the collar 77 of the plunger 64 so that the latter does not bind against the arm 46 when in the fine grinding condition of FIG. 2.

The grinder shift mechanism of the present example permits the grinder 10 to operate in either of two stable states. One such state is a fine grind condition wherein the solenoid 66 is energized, the plunger 64 is in a retracted condition, and the lever 46 is held in its most counter-clockwise position as shown in FIG. 2. In this condition, the adjustment screw 56 bears against the plunder 28 and forces the screw conveyor 18 rearwardly against the main spring 38 such that the rotary burrs 22 move into close proximity with the stationary burrs 20. The other state is a coarse grind condition wherein the solenoid 66 is de-energized and the plunger 64 is free to float upwardly as viewed and does so under action of the main spring 38 which urges the screw conveyor 18 forwardly to push the plunger 28 against the screw 56 so as to pivot the lever 46 clockwise as viewed against the stop pin 58 as shown in FIG. 3. Adjustment of the screw 56 thus affects the fineness of the grinding action of the burrs 20 and 22 when the lever 46 is in the fine grind position of FIG. 2. Similarly, adjustment of the stop screw 58 affects the coarseness of the grinding action of the burrs 20 and 22 when the lever 46 is in the coarse grind position of FIG. 3. Upon binding of the burrs 20 and 22 with beans, the relief spring 76 permits the lever 46 to flex upwardly as viewed to momentarily move the rotary grinder burr 22 away from the stationary burr 20 to relieve the binding of the burrs 20 and 22 when in the fine grind condition of FIG. 2. The resistance to compression of the relief spring 76 on the unhinged end of the lever 46 should be sufficient to overcome the resistance to compression of the main spring 38 in the retracted position of the solenoid plunger 64 and lever 46 as shown in FIG. 2 to permit the lever 46 to hold the grinder burrs 20 and 22 in the desired fine grinding condition under normal conditions of operation. If jamming or binding of the burrs 20 and 22 occurs intermittently or frequently when the lever 46 is in the fine grind position, the adjustment screw 56 should be adjusted outwardly away from the plunger 28 until such binding subsides.

Referring now to FIGS. 4–6, there is shown, in another preferred embodiment of my invention, a conventional coffee grinder 80 which is of the same or similar type as the grinder 10 of the previous example. As in the previous example, the grinder 80 includes a housing 82, end cap 84, screw conveyor 86, end plate 88 connected to the screw conveyor 86, a disc shaped rotary grinder burr 90 attached to the plate 88, a conforming disc shaped stationary grinding burr 92 attached to a wall of the housing 82 and a drive shaft 93 keyed to the screw conveyor for rotatably driving the latter while being longitudinally slidable therein. The shaft 93 is coupled to a suitable drive motor (not shown). A bean grinding chamber 94 communicating with a bean transport chamber 96 and a screw conveyor end cover 98 are also shown. Since the remaining elements of the grinder 80 of the present example are similar to the corresponding elements of the grinder 10, they need not be shown and reference is made herein to the corresponding elements as shown in FIGS. 1–3.

Also, as in the previous example, a plunger element 100 extends from the end of the cover 98 through an opening in the end cap 84. A shifting means or lever arm 102, pivotally connected on one end by means of a hinge 104 to an L-shaped bracket 106 attached to a peripheral edge portion of the cap 84, extends radially across and beyond an opposite peripheral edge portion of the cap 84. The plunger 100 bears against a fine grind adjustment screw 108 projecting through the arm 102 which has the same function as the plunger 28 and adjustment screw 56 of the previous example. The arm 102 extends through a bracket 110 containing a stop means or adjustable stop screw 112, which has the same structure and function as the stop screw 58 and bracket 60 of the previous example. The arm 102 is operatively connected to a plunger 114 of a first solenoid 116 and to a plunger 118 of a second solenoid 120 in the same manner, in both instances, as the lever 46 is connected to the single solenoid 66 in the previous example. Pins 122 pivotally connect to the plungers 114 and 118 and extend through openings 123 in the arm 102. Relief springs 124 are confined between the lever arm 102, around the openings 123, and washers 126. The washers 126 and springs 124 are held in place by nuts 128 threadably secured to upper ends of the pins 122. As in the previous example, the openings 123 should be sufficiently larger in diameter than those of the collars 127 of the plungers 114 and 118 so that the collars do not bind against the arm 102 in any of the grinding conditions shown in FIGS. 4–6.

The mechanism thus described has three stable operating states for altering the spacing of the grinder burrs 90 and 92. The first state is a fine grinding condition as shown in FIG. 4 wherein the outer solenoid 116 is unenergized and the inner solenoid 120 is energized such that the plunger 114 is free to float relative to the body of the solenoid 116 and such that the plunger 118 is held in a retracted position. The relief spring 124 on the outer solenoid 116 is completely uncompressed as shown by a slight gap between itself and the arm 102. Accordingly, in this state, the lever arm 102 is held in its full counterclockwise position at a slightly downward angle as viewed and the screw 108 bears upon the plunger 100 to thus urge the screw conveyor 86 fully rearwardly in the housing 82 against a screw conveyor main spring (not shown but similar to the main spring 38 of FIG. 2) to place the grinder burrs 90 and 92 in a closely spaced fine grinding position. The second state is an intermediate grinding condition as shown in FIG. 5 wherein the outer solenoid 116 is energized and the solenoid 120 is unenergized. Accordingly, in this state, the plunger 118 of the inner solenoid 120 is free to float upwardly and does so under influence of the screw conveyor main spring. However, the plunger 114 of the outer solenoid 116, being retracted, limits the clockwise movement of the arm 102 to a position still spaced from the adjustable coarse grind stop screw 112. In this intermediate state, the relief spring 124 on the outer solenoid 116 is slightly compressed and the arm 102 is essentially level as viewed. The third state is a coarse grinding condition as shown in FIG. 6 wherein both of the solenoids 116 and 120 are unenergized such that the plungers 114 and 118 are both free to float upwardly as viewed and do so under the influence of the main spring of screw conveyor 86, whereby the arm 102 extends at an upward angle as viewed and rests against the stop screw 112. Notice that the gap between the plunger 114 and the body of the solenoid 116 is greater than the gap between the plunger 118 and the body of the solenoid 120 when the grinder is in this condition.

The solenoid 120 may be attached to the end cap 84 by a bracket 129, the same as solenoid 66 of the previous example is attached to end cap 26, and the outer solenoid 116 may be suitably attached to a plate or other supporting bracket affixed to the cabinet containing the grinder 80 or to an extended bracket depending from the end cap 26.

Referring now to FIG. 7, there is shown in another preferred embodiment of my invention, a balanced three stage grinder shift mechanism for a conventional coffee grinder 130. The grinder 130 may be of the same type as the grinders 10 and 80 of the previous examples. In this example, a pair of solenoids 132 and 134 are attached by means of brackets 136 to oposite edge portions of a grinder end cap 138 in the same manner, in both instances, as the solenoid 66 is attached to the cap 26 of the apparatus of FIGS. 1–3. A lever arm 140 extends across and beyond opposite edge portions of the cap 138 under a pair of bracket-mounted stop screws 142 and 144 and is connected on opposite end portions to solenoid plungers 146 and 148 as in the previous examples. A central portion of the lever arm 140 contains a fine grind adjustment screw 150 which bears against a plunger 152 which, in turn, projects through a central opening in the end cap 138 against an end cover 154 of a screw conveyor 156. The conveyor 156 is driven in a conventional manner by a drive shaft 157 connected to an electric motor, not shown. As in the previous examples, an end plate 158 of the screw conveyor 156 carries a disc shaped rotary grinder burr 160 adapted to operate in conjunction with a conforming stationary grinding burr 162. The mechanism of FIG. 7 is shown in a coarse grinding condition wherein both of the solenoids 132 and 134 are unenergized so that the plungers 146 and 148 are free to float upwardly as viewed with the lever arm 140 under the influence of a screw conveyor main spring (not shown but the same as the main spring 38 shown in FIG. 2). In the coarse grind condition shown, the plunger 152 thus pushes opposite end portions of the arm 140 upwardly as viewed against the stop screws 142 and 144.

The mechanism of FIG. 7 provides three stable grinding conditions, namely, fine, intermediate and coarse grinding conditions just as in the previous example. However, in this case, the arm 140 pivots about the plunger 152 instead of a hinged end and requires two coarse grind stop pins 142 and 144 instead of one. To shift the balanced mechanism of FIG. 7 from the coarse grinding state as shown to the intermediate grinding state, either one of the solenoids 132 and 134 may be energized to pull one end of the arm 140 downwardly as viewed. This forces the plunger 152 to push the screw conveyor 156 downwardly as viewed into a main spring, not shown but similar to the spring 38 in FIG. 2 and pushes the rotary burr 160 closer to the stationary burr 162. To shift to the fine grind state, both of the solenoids 132 and 134 are energized to pull both ends of the arm 140 downwardly as viewed to further push the plunger 152 and screw conveyor downwardly as viewed against the main spring to place the rotary burr 160 at its closest position relative to the stationary burr 162. The screw 150 can be adjusted to adjust the fineness of the coffee being ground in the fine grind position and the screws 142 and 144 can be adjusted for the desired level of coarse grinding.

Figure 8:
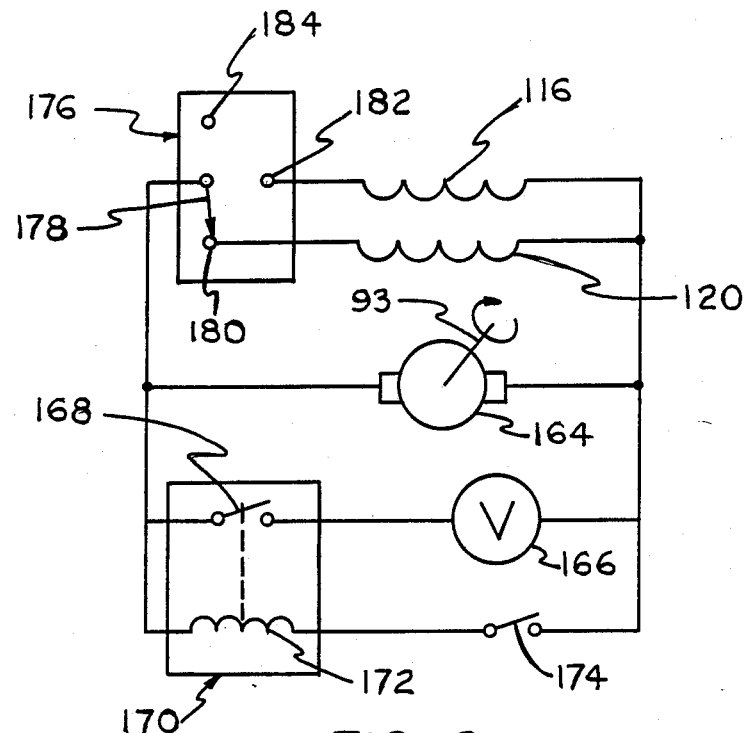
FIG. 8 shows a schematic diagram of a coffee or nut grinder and solenoid switching circuit for shifting the grinding conditions of the grinder shift mechanism of FIGS. 4–6.

Reference is now made to FIG. 8 which shows one example of a suitable switching circuit for the grinder 80 and solenoids 116 and 120 of FIGS. 4-6. A suitable electric motor 164 for operating the drive shaft 93 of the screw conveyor 86 and rotary grinding burr 90 is shown connected across a suitable voltage source 166 through a contactor 168 of a relay 170. A relay coil 172 of the relay 170 and a manually operable motor on/off switch 174 are series connected across the source 166. The solenoids 116 and 120 are alternatively connectable through a suitable three-position rotary switch 176 to the source 166 when the motor control switch 174 is in a closed condition so that the relay 170 is energized. The switch 176 includes a manually operable contact 178 which connects one side of either the solenoid 116 or 120 as desired through the relay contact 168 to one side of the source 166. The other side of the solenoids 116 and 120 are connected to the other side of the source 166. In the position shown, the switch 176 connects the switch 168 and source 166 across the solenoid 120 while leaving the solenoid 116 unenergized, which is the fine grinding condition of the grinder as shown in FIG. 4. When the contact 178 is turned from a terminal 180 as shown to a terminal 182, the solenoid 120 is de-energized and the solenoid 116 becomes energized which is the intermediate grinding condition illustrated in FIG. 5. Finally, when the contact 178 is turned so as to engage a terminal 184, both of the solenoids 116 and 120 will be de-energized which is the coarse grinding condition illustrated in FIG. 6.

The circuit of FIG. 8 can be adapted to operate the grinder of FIGS. 1-3 by merely connecting the solenoid 66 of the latter figures in place of the solenoid 120. The terminal 182 will be unused since a second solenoid is not used in the system of FIGS. 1-3. Thus when used to operate the solenoid 66 of FIGS. 1-3, a two position rotary switch can be used in place of the three position switch 176 of FIG. 8.

Figure 9:
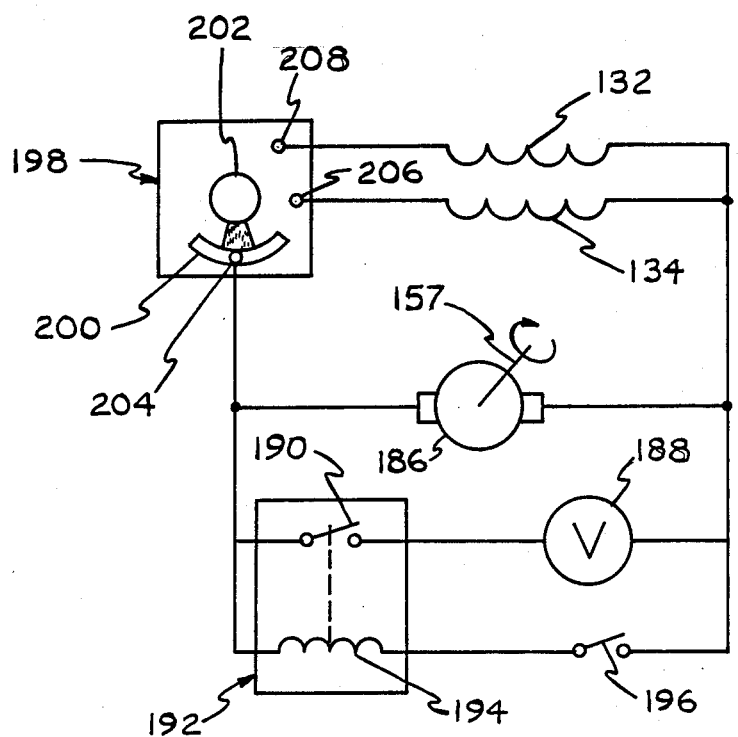
FIG. 9 shows a schematic diagram of a coffee or nut grinder and solenoid switching circuit for shifting the grinding conditions of the grinder shift mechanism of FIG. 7.

Referring now to FIG. 9, there is shown a suitable switching circuit for the grinder 130 and solenoids 132 and 134 of FIG. 7. A suitable motor 186 is connected to the drive shaft 157. A voltage source 188 is connectable across the motor 186 through contacts 190 of a relay 192. A coil 194 of the relay 192 is also connected across the source 188 through a grinder motor control switch 196. A switch 198 contains a shorting bar 200 movable by means of a knob 202 to connect a common terminal 204, tied to one side of the source 188 through the contacts 190, to either a terminal 206 or to both the terminal 206 and a terminal 208. The solenoid 134 is connected between the terminal 206 and the other side of the source 188. Similarly, the solenoid 132 is connected between the terminal 208 and the other side of the source 188. In the position shown, terminals 206 and 208 of the switch 198 are disconnected from the common terminal 204, whereby both of the solenoids 132 and 134 are unenergized. This, then, is the coarse grind condition of the grinder 130 as shown in FIG. 7. To move to the intermediate grinding condition, the knob 202 is turned so that the shorting bar 200 connects the switch terminals 204 and 206 together whereby the solenoid 134 is energized while the solenoid 132 remains unenergized. The fine grinding condition is obtained by turning the knob 202 such that the bar 200 connects all three terminals 204, 206 and 208 together, whereby both of the solenoids 132 and 134 are energized.

The solenoid 66 of FIGS. 1-3, the solenoids 116 and 120 of FIGS. 4-6 and the solenoids 132 and 134 of FIG. 7 are all of the familiar pull type. It will be appreciated that solenoids of the push type can be employed in their places so that the various lever arms will be pushed toward their intermediate and fine grinding conditions, as the case may be. Also, air or hydraulic actuating devices can be used in place of the subject solenoids as desired.

Although the subject invention has been described with respect to specific details of certain preferred embodiments, it is not intended that such details limit the scope of my invention otherwise than as specifically set forth in the following claims.

I claim:

1. In combination with a grinder of the type which includes a housing and an adjustable grinder means disposed in said housing for grinding beans or nuts to a selected particulate size within a range of permissible sizes, a grinder shift mechanism comprising:

biasing means for urging said grinder means toward a predetermined coarse grinding condition to grind beans or nuts to a maximum predetermined particulate size, shifting means operatively connected to said grinder means for shifting said grinder means from said coarse grinding condition to a first fine grinding condition in opposition to said biasing means to grind said beans or nuts to a minimum particulate size, said shifting means comprising a pivotally movable lever arm for shifting between said coarse and said first fine grinding condition, and first means operatively connected to said shifting means for automatically activating said shifting means upon command by changing from a first state to a second state.

2. The mechanism of claim 1 wherein said shifting means is also responsively associated with said grinder means for permitting said biasing means to shift said grinder means from said fine grinding condition to said coarse grinding condition upon a change of said actuating means from said second state to said first state.

3. The mechanism of claim 1 wherein said actuating means comprises a first solenoid stationarily mounted relative to said housing and operatively connected to said shifting means.

4. The mechanism of claim 3 wherein said first solenoid is connected to said housing.

5. The mechanism of claim 1 further comprising stop means stationarily mounted relative to said housing for limiting the movement of said shifting means in one direction in response to said biasing means to establish said coarse grinding condition of said grinder means and the maximum particulate size of beans or nuts to be ground.

6. The mechanism of claim 5 wherein said stop means is adjustable for adjusting said coarse grinding condition to adjust said maximum particulate size.

7. The mechanism of claim 1 further comprising means operatively connected to said shifting means and responsive to said grinder means for momentary actuation of said shifting means to relieve binding forces in said grinder means when said grinder means is in said fine grinding condition.

8. The mechanism of claim 7 wherein said momentary actuation means comprises a relief spring operatively connected between said shifting means and first actuating means so as to be compressible to permit said grinding means to momentarily operate said shifting means independent of said first actuating means to relieve binding forces in said grinder means.

9. The mechanism of claim 1 further comprising means connected to said shifting means and opertively associated with said grinder means for adjusting said fine grinding condition to change said minimum particulate size.

10. The mechanism of claim 1 further comprising second means operatively associated with said shifting means for further actuating said shifting means to shift said grinder means from said first fine grinding condition to a second fine grinding condition in further opposition to said biasing means, said first fine grinding condition being intermediate between said coarse grinding condition and said second fine grinding condition for grinding beans or nuts to a particulate size between said maximum and minimum sizes.

11. The mechanism of claim 1 wherein said lever arm is hingably connected on one end thereof to a surface which is stationary with respect to said housing, said first actuating means being connected to an opposite end portion of said arm.

12. The mechanism of claim 1 wherein said lever arm contains a pivot point on a central portion of said arm, which pivot point is operatively associated with said grinder means for shifting said grinder means from a coarse grinding condition to first and second fine grinding conditions, said first fine grinding condition being intermediate said coarse and said second fine grinding condition for grinding beans or nuts to an intermediate particulate size between said maximum and minimum particulate sizes, said first actuating means being connected to one end portion of said lever arm, said mechanism also including a second actuating means operatively connected to the other end portion of said lever arm for shifting said grinding means between said intermediate position and said second fine grind condition when said first actuating means is in said second state.

13. In combination with a bean or nut grinder of the type which includes a housing having an end wall, a longitudinally movable and rotatable feed screw conveyor disposed in said housing, a stationary grinding burr fixedly attached to a wall in said housing, a rotary grinding burr attached to one end of said screw conveyor for movement therewith, and spring biasing means for urging longitudinal movement of said screw conveyor in one direction in said housing for urging said rotary burr away from said stationary burr toward a coarse grinding condition, a grinder shift mechanism comprising a lever arm hingably connected on one end thereof to a peripheral edge portion of said end wall, said lever arm extending across and beyond an opposite peripheral edge portion of said end wall, stop means connected to said opposite peripheral edge portion of said end wall for limiting the rotational movement of the other end of said lever arm away from said end wall, a plunger element slidably projecting through said end wall and being confined between one end of said screw conveyor and said lever arm at a position on said lever arm between said hingably connected end and said stop means, and first actuating means stationarily mounted relative to said housing and operatively associated with an end portion of said lever arm opposite said hingably connected end for rotating a free end of said lever arm toward said end wall on command to push said plunger element against one end of said screw conveyor to move said rotary burr a preselected distance toward said stationary burr from a coarse grinding setting determined by said stop means to a fine grinding condition in opposition to said biasing means.

14. In combination with a bean or nut grinder of the type which includes a housing, a longitudinally movable and rotatable feed screw conveyor disposed in said housing, a stationary grinding burr fixedly attached to a wall in said housing, a rotary grinding burr attached to one end of said screw conveyor for movement therewith, and a spring biasing means for urging longitudinal movement of said screw conveyor in one direction in said housing to urge said rotary burr away from said stationary burr toward a coarse grinding condition, a grinder shift mechanism comprising a lever arm hingably connected on one end thereof to a first outside edge portion of an end wall of said housing, said lever arm extending across and beyond said end wall, stop means connected to an outside edge portion of said end wall opposite said first outside edge portion for limiting the rotational movement of the other end of said lever arm away from said end wall to establish a coarse grinding setting of said grinding burrs, a plunger element slidably projecting through said end wall and being confined between one end of said screw conveyor and said lever arm at a position on said lever arm between said hingably connected end and said stop means, first actuating means stationarily mounted relative to said housing and operatively connected to an end portion of said lever arm opposite said hingably connected end for rotating said opposite end of said lever arm toward said end wall on command to push said plunger element against one end of said screw conveyor to move said rotary burr a first preselected distance away from said coarse grinding setting toward said stationary burr to an intermediate grinder setting, and second actuating means stationarily mounted relative to said housing and operatively connected to said lever arm between the connection of said first actuating means and said stop means for rotating said opposite end of said lever arm toward said end wall on command to push said plunger element against one end of said screw conveyor to move said rotary burr a second preselected distance away from said intermediate grinder setting toward said stationary burr to a fine grinder setting.

15. In combination with a bean or nut grinder of the type which includes a housing, a longitudinally movable and rotatable feed screw conveyor disposed in said housing, a stationary grinding burr fixedly attached to a wall in said housing, a rotary grinding burr attached to one end of said screw conveyor for movement therewith, and a spring biasing means for urging longitudinal movement of said screw conveyor in one direction in said housing to urge said rotary burr away from said stationary burr toward a coarse grinding condition, a grinder refinement mechanism comprising a plunger element slidably projecting through an end wall of said housing against a foward end of said screw conveyor, a lever arm extending across and over an outer surface of said end wall, an approximate longitudinal mid-point of said arm bearing upon an outer end of said plunger to provide a fulcrum for said arm, first and second actuating means connected to opposite end portions of said arm, each of said actuating means having a first and second position, first and second stop means connected to opposite end portions of said end wall for balancing said arm on said plunger when both of said actuating means are in said first positions, said first actuating means being operable between its first and second positions for tilting said arm on said plunger to move said plunger and screw conveyor a first preselected distance to move said rotary burr toward said stationary burr from said coarse grinding condition to an intermediate grinding condition, said second actuating means being operable when said rotary burr is in said intermediate condition for tilting said arm back to a level position relative to said end wall to further move said rotary burr toward said stationary burr from said intermediate condition to a fine grinding condition.

16. The mechanisms of claims 14 or 15 further comprising means connected to said arm for manually adjusting the fine grinding condition of said burrs.

17. The mechanisms of claims 14 or 15 further comprising means for manually adjusting said stop means for adjusting the coarse grinding condition of said burrs.

18. The mechanisms of claims 14 or 15 further comprising relief spring means connected between said actuating means and arm for permitting said arm to momentarily flex away from said housing to relieve binding that may occur between said burrs.

* * * * *